United States Patent [19]

Loh

[11] 4,270,022

[45] May 26, 1981

[54] IDEOGRAPHIC CHARACTER SELECTION

[76] Inventor: Shiu C. Loh, Flat 6b, University Residence No. 4, The Chinese University of Hong Kong, Shatin N.T., Hong Kong

[21] Appl. No.: 49,089

[22] Filed: Jun. 18, 1979

[30] Foreign Application Priority Data

Jun. 22, 1978 [GB] United Kingdom ............... 27636/78
Nov. 3, 1978 [GB] United Kingdom ............... 43081/78

[51] Int. Cl.³ ........................... B41J 3/50; H04L 3/00

[52] U.S. Cl. ................................ 178/30; 340/365 R; 400/110; 400/484

[58] Field of Search ............... 400/109, 110, 111, 484; 178/30; 340/365 R

[56] References Cited

U.S. PATENT DOCUMENTS 3,809,204 5/1974 Ogawa ................................ 400/484
4,145,570 3/1979 Diab ...................................... 178/30

*Primary Examiner*—Thomas A. Robinson

*Attorney, Agent, or Firm*—Morgan, Finnegan, Pine, Foley & Lee

[57] ABSTRACT

A character selection keyboard for use in connection with an ideographic language of which the characters can each comprise one or more of a set of character components, as defined. The keyboard comprises an array of character component keys each bearing a symbol corresponding to a character component. Some of the components have separate linguistic identity and can accordingly be used in isolation to constitute characters in the ideographic language; these components are all depicted within a part of the array which is visually distinct from the rest of the keyboard. The keyboard can be connected in a composing system in which data defining the structure of the characters constituted by the components selected by key actuation is derived from a programmable store in response to key signals generated by the key actuation. The keyboard may also be used in typewriters, telex machines, and other systems requiring data input.

14 Claims, 5 Drawing Figures

IDEOGRAPHIC CHARACTER SELECTION

FIELD OF THE INVENTION

This invention relates to a keyboard for use in the selection of characters in an ideographic language, such as Chinese and other Oriental languages which use a large number of symbols for written communication, and to a system including such a keyboard.

The keyboard of the invention is adaptable for many uses. It may, for example, be adapted for use in a system for the composition, e.g. photocomposition of such characters.

BACKGROUND OF THE INVENTION

Many of the known systems for ideographic composition suffer from one serious disadvantage which results in complicated and time consuming operation. The disadvantage resides in the nature and design of the character selection part of the system, commonly a keyboard. Because of the volume of characters constituting the vocabulary in such ideographic languages as Chinese, the use for such languages of the basic keyboard arrangement, employed for English and other European languages, in which each different character is assigned to a respective key of the keyboard, results in a single extremely large keyboard, or possibly in a set of alternative keyboards. Even in the latter arrangement, each keyboard includes a very large number of keys, the process of character selection by the keyboard operator involving searching through the large keyboard character vocabulary resulting in an undesirably long average character selection period.

Computer operated photocomposing systems are presently being developed, in which the data concerning character form is stored in an accessible store and is extracted therefrom in response to store address signals derived from keyboard operation. The computer can be programmed to carry out automatic justification and spacing of the characters produced in a suitable photocomposing machine supplied with the aforesaid data.

The continual advances made in computer technology have resulted in the provision of considerable data storage facilities such that in the field to which this invention relates, the storage of the information concerning the orthographic structure of the characters of an ideographic language is a relatively insignificant problem as compared with that of character selection. Clearly this is because it is improbable that, in the foreseeable future, the human element will be entirely eliminated from the process of sequential selection of the characters. Where, as in composition in English or some other European language, the process of character selection is related to a small character alphabet, the dependence of this process upon human visual and intellectual functions represents a very minor problem in terms of efficiency, as measured in, for example, words per minute, as compared with ideographic languages employing vast alphabets of ideographic characters (roughly equivalent to "words" in English).

On the other hand, once the process of character selection has been carried out, the subsequent processes of signal generation, data retrieval, character justification spacing and formation can all proceed automatically under the direction of computer programme without human intervention and the attendant limitations concerning speed of operation.

It would therefore be advantageous to provide a system in general, and a keyboard in particular, adapted to improve the character selection rate and to facilitate the application of computer operated photocomposition to ideographic languages.

All of the more common Oriental ideographic languages e.g. Chinese, Japanese, Korean possess a common feature, viz. most of the characters of any such language can be constructed from a respective set of basic character components, or so-called modified radicals. As used herein a character component is a basic character element which may or may not have both linguistic and orthographic identity (by this it is meant that it may or may not have a meaning of its own in the linguistic sense and be visually represented alone in the orthographic sense) but which can form part of one or more composite characters comprising different geometrical arrangements of such character components. This construction of characters from relatively simple components is a well-known characteristic of ideographic languages and accordingly will not be discussed in greater detail herein.

It has therefore become clear during the course of the inventor's research into the possibility of improving the character selection facility in equipment requiring manual operation to achieve sequential character selection, that a keyboard having very much fewer keys than in known systems where each full ideographic character is assigned to a respective key, could provide the selection facility if instead the keys had these character components assigned to them. An operator having knowledge of, say Chinese, and able, (as any reasonably literate Chinese person would be) to decompose notionally a Chinese character into its constituent components could operate such a keyboard by depressing the selected keys in the order on which the associated components would be written when writing the character by hand. For each Chinese character, this order is laid down by recognised orthographic rules and can therefore be employed as part of the basis for a system for responding to the operation of the selected keys to identify uniquely the character constituted by the character components associated with those keys.

SUMMARY OF THE INVENTION

According to a first aspect of the invention there is provided a character selection keyboard for use in connection with an ideographic language of which the characters can each comprise one or more of a set of character components, as herein defined, the keyboard comprising an array of character component keys each bearing a symbol corresponding to a character component wherein some of said components have separate linguistic identity and can accordingly be used in said ideographic language in isolation to constitute characters in said ideographic language, and wherein said components having separate linguistic identity are all depicted within a part of the array which is visually distinct from the rest of the keyboard.

Preferably, the arrangement of the character components depicted visually on the keyboard, other than said components having separate linguistic identity, is in substantial accord with the positions generally occupied by such components in the composite characters. More particularly, the keyboard array may be arranged in groups of keys which are visually distinct, (e.g. each group may consist of keys of a different colour) and which each comprise keys bearing symbols corresponding to those character components of which the position in composite characters generally corresponds to the position of the group on the keyboard.

Within each such visually distinct group the components may be arranged in an appropriate sequence, for example from left to right, top to bottom in a row/-column keyboard arrangement, in accordance with the ascending number of strokes in the typographical forms of the components.

Alternatively, the components may be arranged, either in the said part of the array including components having separate linguistic identity or in the whole array, substantially in accordance with the contemporary "Ping" method of Chinese character index notation; thus the components would be grouped substantially in accordance with the nature of the first stroke formed when writing each such component.

According to a second aspect of the invention, there is provided a system for use in an ideographic language of which the said characters can each comprise one or more of a set of character components, as herein defined, the system comprising a keyboard of which the keys bear symbols corresponding to the said character components, said keyboard being operable by selective actuation of said keys to provide key signals identifying the particular keys, and thereby the components, selected by actuation, and means adapted to respond to said key signals to generate coded character signals defining the characters constituted by said selected radicals.

Embodiments of the present invention will now be described by way of example with reference to the accompanying drawings, in which.

DESCRIPTION OF THE PREFERRED EMBODIMENTS

Figure 1:
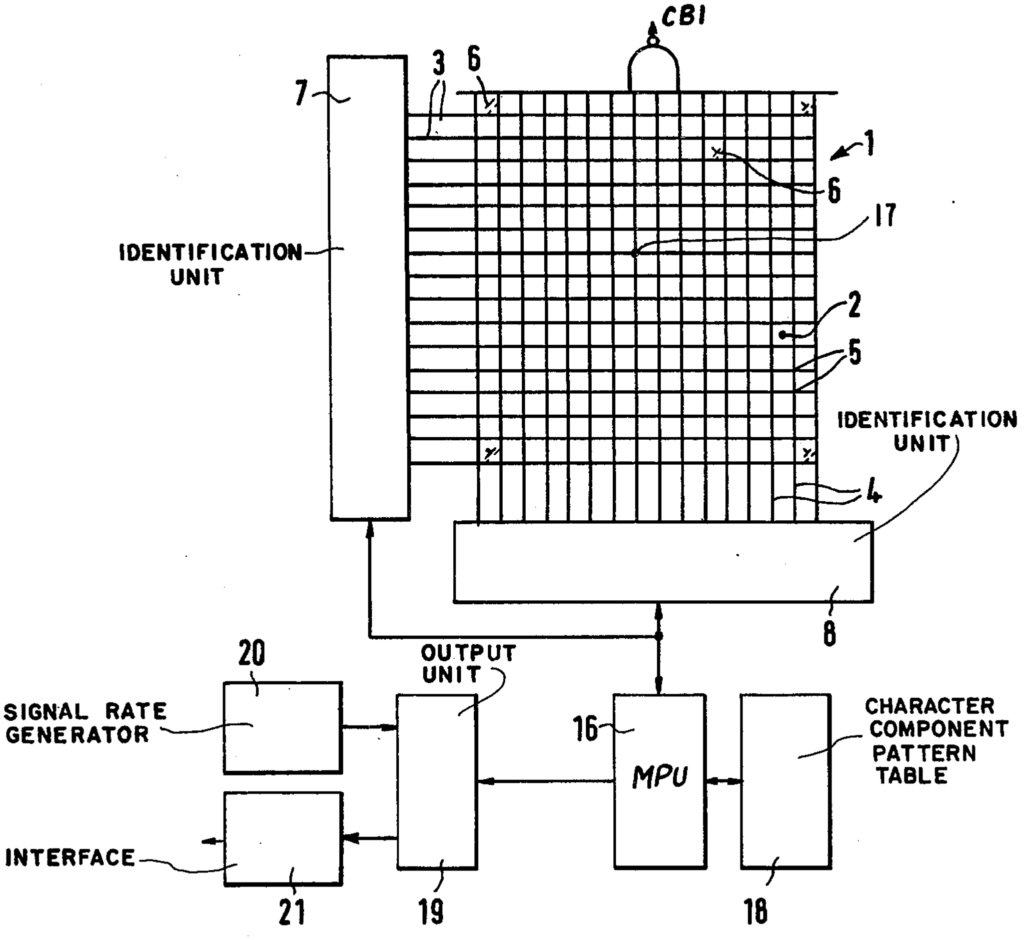
FIG. 1 is a block diagram illustrating schematically a keyboard system in accordance with the invention.

With reference to FIG. 1 an electronic keyboard system 1 is illustrated, in which the keyboard 2 itself is shown as consisting of a plurality of parallel X conductors 3 and a plurality of parallel Y conductors 4 extending perpendicularly across the X conductors to define a grid of crossing points 5. The X and Y conductors are normally held out of contact with each other, and the keys (not shown) of the keyboard are operable to establish contact at the respective crossing points, as depicted at points 6. Numerous keyboards of this basic construction are commercially available and a further description of the construction details, which do not form part of this invention, is not thought necessary here. The X and Y conductors are connected to respective row and column identification units 7 and 8. These units are addressable to provide data identifying the particular X and Y conductors of the conductor pair which becomes connected by the operation of a key.

In the illustrated embodiment the keyboard has sixteen X conductors, sixteen Y conductors, and accordingly 256 crossing points, which shall be referred to as keys. Though not essential, the provision of 256 keys is of particular convenience in the conversion (in a manner to be discussed later herein) of keystroke operation into binary key signals identifying the particular keys actuated, since it is consistent with the preferred form of such binary key signals, which is eight-bit binary word, providing a maximum of 256 different words.

It will be appreciated that although the arrangement of X and Y conductors illustrated in FIG. 1 provides a simple 16×16 square key array, any arrangement of 256 keys can be used provided that the wiring of the keyboard is appropriately adjusted to provide for each key a unique X/Y conductor contact facility. For example, the keyboards of FIGS. 2 and 3 each have a total of 256 keys though arranged in a main part 10 comprising a 14×17 array of character component keys and a set 13 of function keys arranged in a 2×9 array.

Figure 2:
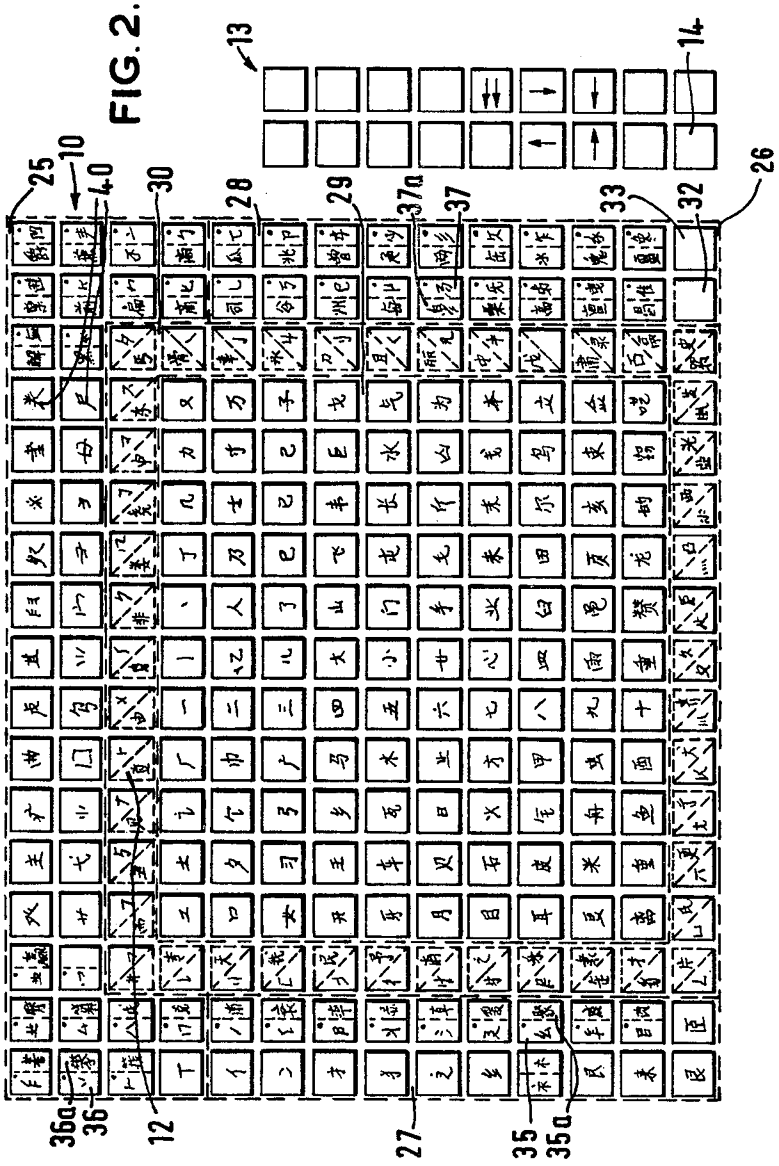
FIG. 2 illustrates a keyboard, each square representing a key, and the symbols within the squares corresponding to the symbols provided on the keys.

The keys, or more precisely, the keyboard display which visually defines the key positions for manual operation, indicates, for each key a symbol or symbols 40, as illustrated in FIG. 2. The FIG. 2 display is designed particularly for character selection in Chinese language.

The design of the main part 10 of this keyboard display is based on the fact that most of the Chinese characters can be constructed from a specially produced set of basic character components (or so-called modified radicals). According to their usual relative positions within a Chinese character, the components are classified into five different types:

(1) "Upper" components—those components which usually appear in the upper part of a character.

(2) "Lower" components—those components which usually appear in the bottom part of a character.

(3) "Left" components—those components which usually appear in the left-hand part of a character.

(4) "Right" components—those components which usually appear in the right-hand part of a character.

(5) "Free" components—those components which have separate linguistic identity (i.e. they have meaning when used in isolation) and can themselves constitute characters, or are difficult to classify into any of types (1) to (4) above.

Figure 3:
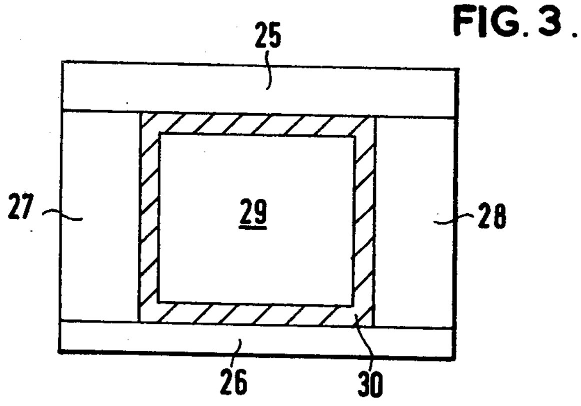
FIG. 3 illustrates schematically the relative positions of the groups of character components or modified radicals, depicted on the keyboard represented by FIG. 2.

The keys of the keyboard array are, as illustrated in FIGS. 2 and 3, divided into groups occupying the following main regions: "Upper", "Lower", "Left", "Right" and "Central" regions, 25 to 29 respectively for accommodating the above types of components (1) to (5) respectively.

Each of the components occupies a unique key. However, at the boundaries of the "Central" region with other regions, keys are shared by adjacent components of the two different regions. These keys form a special region called the "overlay" region 30.

Also, some particular keys in the Left, Top and Right regions bear, in addition to respective ones of the aforesaid character components, respective composite characters. The advantage of this additional feature will be explained later herein; for the sake of clarity, in each of the squares in FIG. 2 representing one of these particular keys, a dot marks the part of the key which bears the symbol corresponding to the character components. Accordingly, FIG. 2 illustrates clearly the shapes of the character components of the set developed by the inventor in accordance with the present invention.

Within the "Left", "Right", "Lower" and "Central" regions, the components are arranged in a "left to right" and "top to bottom" manner according to their number of strokes. That is, components with a fewer number of strokes are placed at the "left-upper" part of the region. However, components in the "upper" region are arranged in a different manner, i.e., components with fewer strokes are placed at the "left-lower" part of the region.

The five different regions of the keyboard can conveniently be rendered visually distinct by providing different coloured keys. For example, in a practical embodiment the keys of the upper region are red, the keys of the left region are yellow, the keys of the right region are blue and the keys of the central region are white. The lower side of the overlap region itself constitutes the lower region, and the portions of the keys bearing the lower components are green. Each key in the overlap region is divided diagonally into two portions coloured according to the regions of the keyboard which share that key, and the two symbols depicted on that key are located on the respective portions to indicate for each symbol the type of the component. For example, key 12 bears the symbols γ and ± but clearly indicates that γ is an "upper" component and ± is a "free" component. In FIG. 2, the boundaries of the different keyboard regions are indicated in dashed lines. For each square representing a key in the overlay region, the two sides adjacent the part of the key bearing the component belonging to the set of "free" components are shown in broken line. The keyboard also has a set of function keys 13 necessary to permit the operator to select certain functions during the setting of text. For example, key 14 is operated when a full line of characters has been set and a new line is to be started. The remaining function keys provide selection of various operations necessary, as is well known, in composing.

The main portion 10 includes two function keys, a delimiter key 32, and a cancel key 33. The delimiter key 32 is operated after the completion of each character selection operation consisting of the actuation of one or more character component keys. The cancel key 33 is operated when an error has been made in the actuation of the character component keys.

To key in a Chinese character, the character must first be notionally decomposed into its constituent components, or modified radicals. The process of character decomposition merely involves, for an operator reasonably skilled in the writing of Chinese characters, the application of his knowledge of the orthographic rules governing Chinese character construction. These constituent components will then be "keyed-in" by actuation of the appropriate character component keys in the order in which the components would be formed when writing the character by hand. The problem therefore is how to key in the required components, or more precisely how to find these components on the keyboard.

The procedure by which the operator will search for a required component is as follows:

(1) Firstly he will determine whether the component can by itself be a Chinese character or not. If it can then the "central" region is searched since this region contains all such components. If the component cannot be found in this region, then the other regions will be searched.

(2) If the component cannot be a character by itself, the operator will check the position it occupies in the required character, and search the corresponding region first.

(3) If a component cannot be found in any of the regions, then a re-decomposition of the character is required.

Referring back to FIG. 1, coupled to the identification units 7 and 8 is a microprocessor unit (MPU) 16 which has a random access memory (RAM). When a key is depressed, say key 17 in FIG. 1 the MPU 16 derives from the units 7 and 8 information identifying the particular X and Y conductors which cross at key 17 and stores this data in binary form in its RAM. The MPU performs upon this data arithmetic functions to produce a binary code identifying the particular key depressed. For example, key 17 is at the cross point of X conductor 7 and Y conductor 8. The units 7 and 8 therefore produce binary patterns 0000001000000000 and 0000000100000000 respectively, each 0 representing a non-connected conductor, and each 1 representing the connected X or Y conductor. The MPU converts these patterns into their binary numerical equivalents and then performs the function:

Row number X16+column number (there being 16 keys in each row) to produce an eight digit binary key code representing the key number. In the present case this key number will be the binary equivalent of 120. The MPU thereby decodes the row number and column number into the key number.

The MPU is coupled for access to a character component pattern table 18 which stores a plurality (in this case 256) of 8-bit code patterns and which correllates the key number code, as produced by the MPU with these patterns, of which each is adapted to identify the particular modified radical or function selected by key operation. The 8-bit patterns are output as digital signals from the MPU through an output unit 19 in response to signals from a signal rate generator 20. An interface unit 21 is provided to modify the output signals in accord with the use to which they are to be put.

Figure 4:
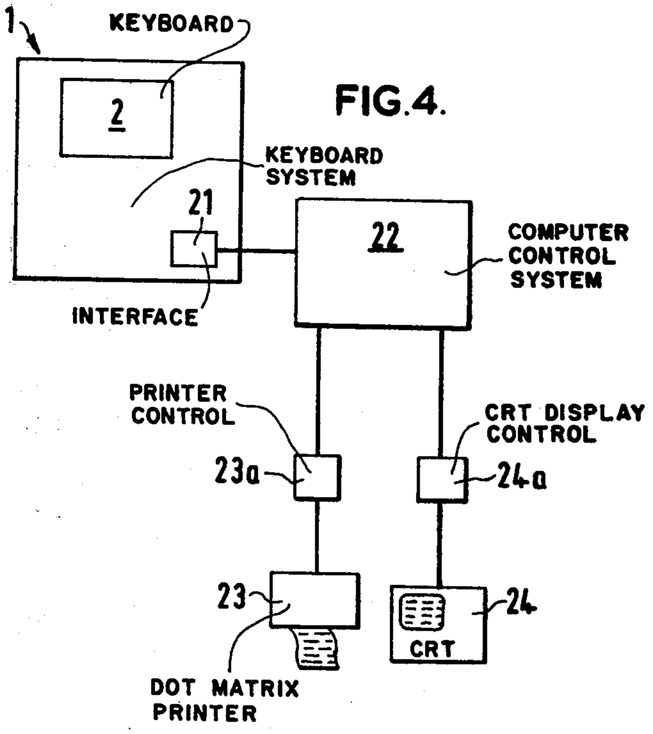
FIG. 4 is another block diagram illustrating schematically the keyboard system 1 in conjunction with various other components of a composition system.

For example, for use in phototypesetting, as illustrated in FIG. 4, the signals from interface 21 pass to a computer control system 22 having a memory which stores data concerning the structure of Chinese characters in the form of programmes which can be read out as binary coded signals capable of operating a dot matrix printer 23 (i.e. a printer which prints a character as a pattern of dots with a matrix of for example $14\times16$ dot positions) through a printer control 23*a*. The printer may operate by projecting a raster-scanning laser beam onto a photosensitive element, and by subjecting the beam to binary logic intensity control during its successive scans in accord with the binary coded signals such that over a number, (e.g. 16) of scans across the photosensitive element, a line of characters is exposed thereon. A second output of the computer may be provided to operate a cathode ray tube display 24 simultaneously with the matrix printer, through a CRT display control 24*a*.

The computer control system operates in accord with the signals supplied through the interface 21 from the keyboard system identifying the modified radicals selected by operation of the keys of portion 10, and the functions commanded by operation of the keys of portion 13. Thus, upon actuation of delimiter key 32 the computer control system receives a signal indicating that a new character is about to be keyed and responds to the signals generated in accord with operation of the character component keys to read out the programme defining the character constituted by the keyed-in components. As mentioned earlier the computer can be programmed to produce the required spacing and justification in the lines of characters printed by the printer.

Each group of key signals, consisting of one or more 8-bit words between two successive key signals denoting successive actuations of the delimiter key, represents a selection process consisting of the selection of one or more character components in a particular sequence indicated by the order in which the key signals appear in the group. The computer programme enables the computer to respond to each such group of key signals to identify uniquely the character defined by that group and to retrieve from the correct part of the data memory the programme defining the structure of that character.

As mentioned earlier, each of a number of the keys in the left, top and right regions of the key array, such as keys 35, 36 and 37, bears not only a symbol corresponding to a particular character component but also a symbol (35*a*, 36*a*, 37*a*) corresponding to a complete character incorporating the component. The purpose of this additional feature is to increase the average character selection rate. The complete character depicted is, in the FIG. 2 embodiment, the most complex character incorporating the component, though as an alternative it may be preferred to depict the most commonly used character incorporating the component. It will be appreciated that this form of doubling in the *outer* regions will not necessitate a further selection operation, for instance by actuation of a shift key, to indicate whether the component or the character is selected, since the computer programme can be adapted to distinguish automatically upon the following logic basis. If, between two successive delimiter key actuations, one of the dual purpose keys is actuated in isolation, it is clear that the operator intends to select the character since it is only the keys in the central and overlay regions which bear components capable of constituting characters. On the other hand, if the actuation of the dual purpose key forms part of a multiple key actuation process, it is clear that the operator intends to select the component. Other keys in the outer regions may be "doubled-up" with characters of another language, for example, the characters used in English and other European languages, or another ideographic language.

In the overlay region 30, in which each key bears two symbols, corresponding to respective components of which one is a "free" component, the key clearly indicates, for example, by colouring which is the free component and which is an outer (left, right, top or bottom) component. If, between successive actuations of the delimiter key an overlay key is actuated in isolation it is clear that the operator has selected the free component since the outer component cannot itself constitute a character. Furthermore, the pairing of the components on the overlay keys is such that actuation of any given overlay key as part of a multiple key actuation process determines automatically which of the two components of that given key is selected. More particularly, for each overlay key, the two components depicted thereon cannot appear in Chinese in conjunction with the same further component or components so that the other particular key or keys operated in the aforesaid multiple actuation process indicate by way of the computer programme which of the two alternative components is selected.

Accordingly, even though these overlay keys each depict two components, selection by way of the further operation of a shift key to determine the particular component selected is rendered unnecessary whether that key is actuated in isolation or in combination with another key or other keys, by virtue of the general arrangement of "free" character components in a distinct region of the keyboard and by virtue of the particular arrangement of components, as shown, for example in FIG. 2 in the overlay region.

The signals from the keyboard system may be converted from transient to permanent form such as punched or magnetic tape, to permit the relevant text to be composed at some future time without keyboard operation. The computer 22 would in this case be provided with a suitable tape reader to reconstitute the operating signals.

The keyboard system can be used to input Chinese characters uniquely to the computer control for processing. The unique Chinese character is selected and constructed simply by pressing those keys bearing the components constituting the said character in a normal writing sequence.

As explained, the arrangement of the components on the keys of the keyboard is according to the relative positions normally occupied by the components within a Chinese character. Also, the components in a particular region are arranged in accord with the number of constituent strokes in an ascending order, to facilitate rapid location of the required component.

The keyboard illustrated in FIG. 2 employs 284 modified radicals of which some (those in the overlay region) share the same key so as to reduce the number of keys without loss of uniqueness. The particular design illustrated have 236 character component keys, though the number will vary depending on the requirement of the system.

The character output may be in different founts which can be prestored in the computer system or other memory units.

By providing an additional 51 keys to cater for the basic Japanese characters, the keyboard may be operable for the Japanese languages. Similarly, the same approach is appropriate for the Korean language, permitting a Korean keyboard to be constructed.

Figure 5:
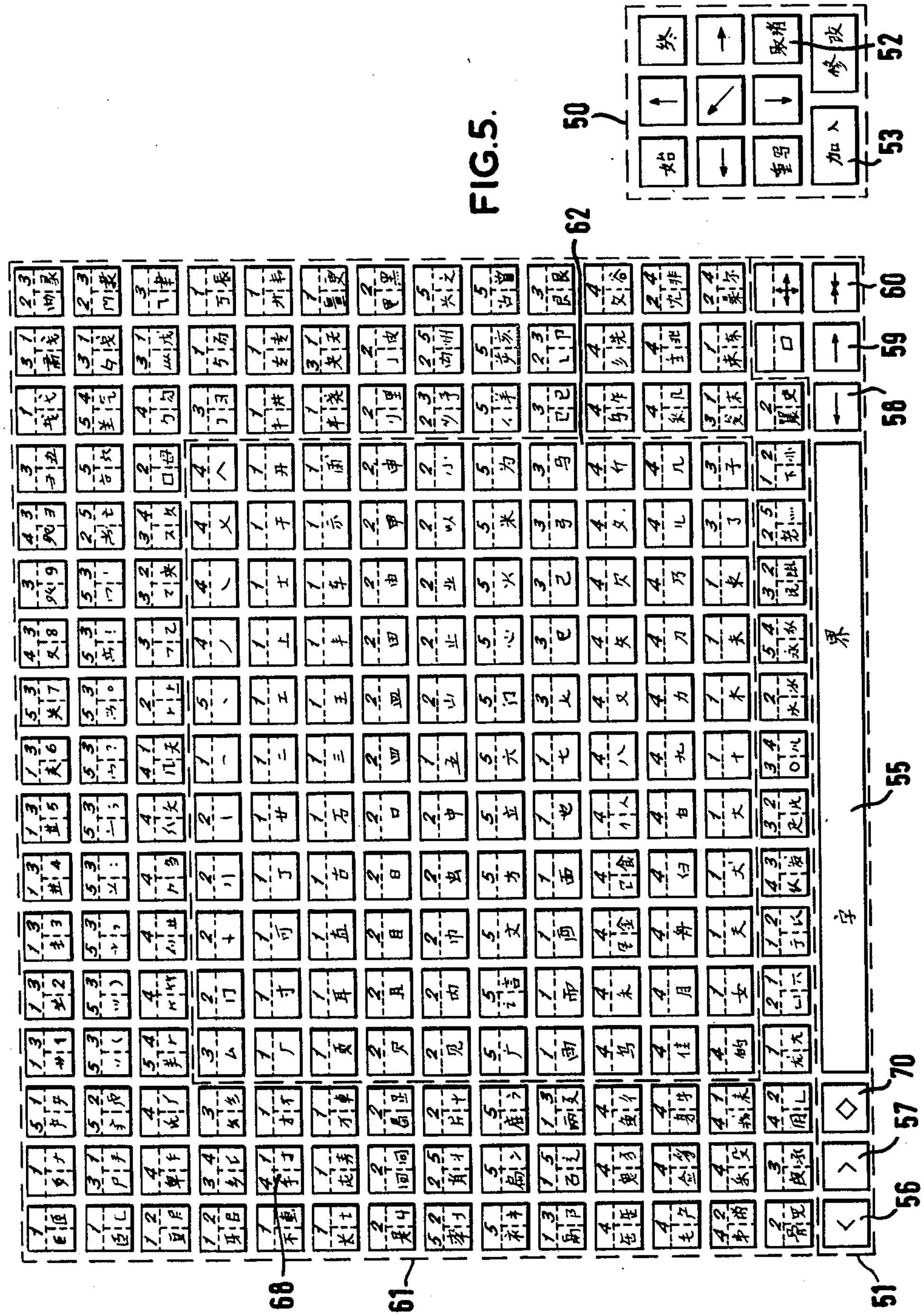
FIG. 5 illustrates, in a manner similar to FIG. 2, another keyboard, according to the invention.

FIG. 5 illustrates another keyboard exhibiting certain modified features of the arrangement of components.

Firstly, it will be noted that the function keys have been rearranged into two groups 50, 51. It is appropriate to mention that the nature and arrangement of the function keys will depend upon the nature of the system of which the keyboard is to form a part. As with the previous embodiment, the FIG. 5 keyboard is intended for use in a typographic composing system in which the text which is being composed is visually displayed as the characters are selected. The group 50 keys define generally editorial functions to permit the amendment of the composed text. For example, the keys depicting differently oriented arrows will determine the movement of a cursor about a video screen displaying the text to permit selection of a character location at which an amending function (such as cancellation by key 52, or insertion by key 53) is to be performed. The group 51 keys generally determine the original composing functions. For example, key 55 is the delimiter key, having the same function as key 32 in the FIG. 2 embodiment;

keys 56, 57 permit preselection of line length; keys 58, 59 are operable to shift the position of the next character to be composed in a text line; key 60 is operable to command the automatic centering of, for example, a text heading in a line.

The FIG. 5 keyboard comprises 256 keys in total as before to make the most efficient use of the digital encoding facility available using 8-bit word digital encoding; of these, 236 keys are used to depict the character components in a main part 61 of the keyboard, the remaining 20 being the function keys described above.

Although not subdivided in the manner schematically shown in FIG. 3 and as described in detail in connection with FIG. 2, the character component array of the FIG. 5 keyboard includes a rectangular central region 62 (in dashed lines) as before, in which all of the most basic components having separate linguistic identity are depicted. This region 62 also still contains many of the other components which normally appear generally centrally of composite characters. The arrangement of the other components in the peripheral region of the main part 61 is partly determined in accordance with the contemporary method of Chinese character indexing known as the "Ping" notation, in which all Chinese characters are categorised in accordance with their initial written strokes. "Ping" provides five basic categories corresponding to the following five initial stroke types:

1. —, or horizontal stroke.
2. |, or vertical stroke.
3. ㇕, or bend stroke.
4. ), or kick stroke.
5. ㇏, or point stroke.

The character components depicted on the keyboard can also be indexed in accordance with "Ping", and the components of each "Ping" category are depicted, as far as possible within the constraints imposed by other requirements in groups of adjacent keys. In FIG. 5, the Ping category of each component or character is indicated with reference to the above table, by a numeral shown immediately above it. Thus, the Ping 1 components/characters are concentrated in the fifth and sixth rows, though smaller groups appear in other, notably the tenth and thirteenth rows. The Ping 2 components/characters are concentrated in seventh and eighth rows, though smaller groups appear in other, notably the fourth row. The Ping 3 components/characters are concentrated in the tenth row, though smaller groups appear in other, notably the first and second rows. The Ping 4 components/characters are concentrated in the eleventh and twelfth rows, though smaller groups appear in other, notably the third, fourth and thirteenth rows, the Ping 5 components/characters are concentrated in the ninth row, though smaller groups appear in other, notably the second row. There are also various isolated components/characters surrounded by components/characters of other Ping types.

This arrangement in accordance with initial stroke type further improves the character selection rate since the mental process of categorising a component into its Ping type is achieved significantly faster than determination of its stroke count, as required to locate a component in the FIG. 2 embodiment.

The fourth to twelfth keys of the first and second rows depict the arabic numerals 1 to 9 and punctuation marks as used in European languages, respectively, to extend the selection facilities afforded. The other outside keys are also "paired" by depicting adjacent a component, a more complex, or auxiliary component, or character having as associated meaning. For example, key 68 includes the component which means "using hands" and the character which means "hand". This pairing is again carefully designed to avoid the necessity to operate any shift key to instruct the computer as to which of the components, or component/character on a depressed key is selected. The logic basis upon which the computer programme can be designed to effect this selection is somewhat as with the FIG. 2 keyboard. Accordingly, operation of a "paired" key alone, between successive operations of the delimiter key will indicate selection of the character, or complex component, since the basic component on the key is not one having linguistic identity (all of these being depicted in the central region 62).

Confusion as to the selection made when a "paired" key is operated in a multiple keying sequence is avoided by ensuring that on each key in the outer region, the complex component or character depicted thereon cannot appear in any character with the same component or as the component depicted on that same key.

The groups of components/characters of similar "Ping" type may be made visually distinct by appropriate colour coding of the keys, in which case some keys will be divided into portions of different colours.

Although, as explained above, the disclosed keyboards are designed to avoid the necessity to use a shift key when operating in the language concerned, the facilities afforded by the keyboard may be further extended by the provision of such a key. For example, instead of providing 51 *further* keys to permit operation in the Japanese language, the supplementary Japanese characters can be "paired" with components on keys in the central region 62. Selection of one of these extra characters, when operating in Japanese, is achieved by actuating the appropriate key, and the shift key 70.

The keyboard of FIG. 5 is, other than the arrangement of the keys, similar to that of FIG. 2 and produces 8-bit words identifying the particular keys which are actuated, in the same way. It can accordingly be used in the system of FIG. 4 with no modification of the system hardware.

The keyboards may be used as a direct or indirect input device to computer or other data processing equipment, or other electronic devices for the purpose of typesetting, printing, teleprinting, word processing and other functions in Chinese, Japanese and Korean. The keyboard may also be used as the basic character selection device in a typewriter.

I claim:

1. A character selection keyboard for use in connection with an ideographic language of which the characters can each comprise one or more of a set of character components, as herein defined, the keyboard comprising an array of character component keys each bearing a symbol corresponding to a character component wherein some of said components have separate linguistic identity and can accordingly be used in said ideographic language in isolation to constitute characters in said ideographic language, and wherein said array comprises a first group of keys constituting a sub-array within said array and a plurality of other groups which are spatially distinct from said first group and wherein said components having separate linguistic identity are all depicted within said first group.

2. A character selection keyboard for an ideographic language of which the characters can each comprise one or more of a set of character components as herein defined, the keyboard comprising an array of character component keys each bearing a symbol corresponding to a character component of which some of said components have separate linguistic identity and can accordingly be used in said ideographic language in isolation to constitute characters in said ideographic language, and wherein said components having separate linguistic identity are all depicted within a part of the array which is disposed substantially centrally of the array and wherein those components, not having separate linguistic identity, are disposed outwardly of said central part of the array.

3. A keyboard according to claim 2 wherein the keys bearing said outwardly disposed components are arranged in visually distinct groups occupying respective outer regions of the array and each comprising keys bearing symbols corresponding to those character components of which the position in composite characters of said ideographic language generally corresponds to the position of the group on the keyboard.

4. A keyboard according to claim 3 and having four said groups occupying regions which appear generally above, below, to the left and to the right, respectively, of the aforesaid part of the array when said keyboard is viewed with the keys uppermost, each said outwardly disposed component being disposed in that region corresponding to the general position of that component at the top, bottom, left or right of said composite characters.

5. A keyboard according to claim 3 or claim 4 wherein in said part and in each said outer region, the components are arranged in a sequence determined by the number of strokes constituting said components.

6. A keyboard according to claim 2 wherein at least some of the components within and at the boundary of said part of the array are each depicted on a respective key upon which is also depicted a respective outwardly disposed component.

7. A keyboard according to claim 2 wherein each of a first set of said outwardly disposed components which are not at the boundary of the said part of the array is depicted on a respective key upon which is also depicted a composite character of said ideographic language.

8. A keyboard according to claim 7 wherein each said composite character includes the component depicted on the same key.

9. A keyboard according to claim 7 or claim 8 wherein each of a second set of said outwardly disposed components which are not at the boundary of the said part of the array is depicted on a respective key upon which is also depicted a character or component of another language.

10. A keyboard according to claim 1 or claim 2 wherein the arrangement of the components on the keyboard is in accord with the Ping method of Chinese character indexing, the array including visually distinct regions, within which the components of the same respective Ping type are concentrated.

11. A keyboard according to claim 10 wherein said array comprises keys arranged in rows and columns, and wherein each said region includes at least a part of at least one row of keys.

12. A keyboard according to claim 1 wherein each of a group of components in said part of the array is depicted on a respective key upon which is also depicted a character or component of another language, the keyboard also including a shaft key.

13. A keyboard according to claim 1 and including means responsive to the selective actuation of the keys to generate key signals identifying uniquely the particular keys selected by actuation.

14. A keyboard according to claim 10 wherein said means are responsive as aforesaid to generate a different binary coded signal for each key.

* * * * *